United States Patent [19]

Poliak

[11] 4,060,020

[45] Nov. 29, 1977

[54] SHEET METAL SCREW

[75] Inventor: John N. Poliak, East Meadow, N.Y.

[73] Assignee: Leviton Manufacturing Co., Inc., Little Neck, N.Y.

[21] Appl. No.: 723,729

[22] Filed: Sept. 16, 1976

[51] Int. Cl.² .............................................. F16B 35/00
[52] U.S. Cl. ...................................... 85/1 L; 85/5 R; 85/11
[58] Field of Search ....................... 85/11, 21, 10 R, 28, 85/5 R, 80, 44, 1 L

[56] References Cited

U.S. PATENT DOCUMENTS

| | | | |
|---|---|---|---|
| 2,110,959 | 3/1938 | Lombard | 85/5 R |
| 2,596,940 | 5/1952 | Poupitch | 85/11 X |
| 2,618,824 | 11/1952 | Poupitch | 24/213 B X |
| 2,687,666 | 8/1954 | Chalfont et al. | 85/11 |

Primary Examiner—Ramon S. Britts
Attorney, Agent, or Firm—Paul J. Sutton

[57] ABSTRACT

A sheet metal mounting screw and method of forming the same is disclosed. The screw is formed from a single flat blank of sheet metal having a generally T-shaped head and a slotted shank or barrel. The shank, when folded, is tubular and has a seam extending along one side, with spaced resilient teeth extending outwardly from opposite sides thereof. The teeth have inclined outer edges arranged in a helical path extending lengthwise around the shank in staggered relation to one other, for engagement with either tapped or untapped openings in a support. The teeth are resilient and permit a push-in insertion of the threaded shank in the helically threaded opening. The T-shaped head is formed integrally with the shank and contains a tool-receiving slot, which permits the screw to be turned angularly in tightening or removing the screw.

In forming the screw, a T-shaped blank is cut from a sheet of resilient metal. The spaced teeth are cut from the shank and are bent outwardly. Upper ends of the teeth are inclined and are arranged in a helical path around the shank for engagement with the threaded opening in the support. The shank is rolled into a tubular form with a tapered lower extremity which enters the opening in the support. The T-shaped upper end of the blank is then folded to form the head of the screw with the slot therein extending transversely of the shank. The sides of the T-shaped bend are folded to form supports extending along opposite sides thereof.

1 Claim, 11 Drawing Figures

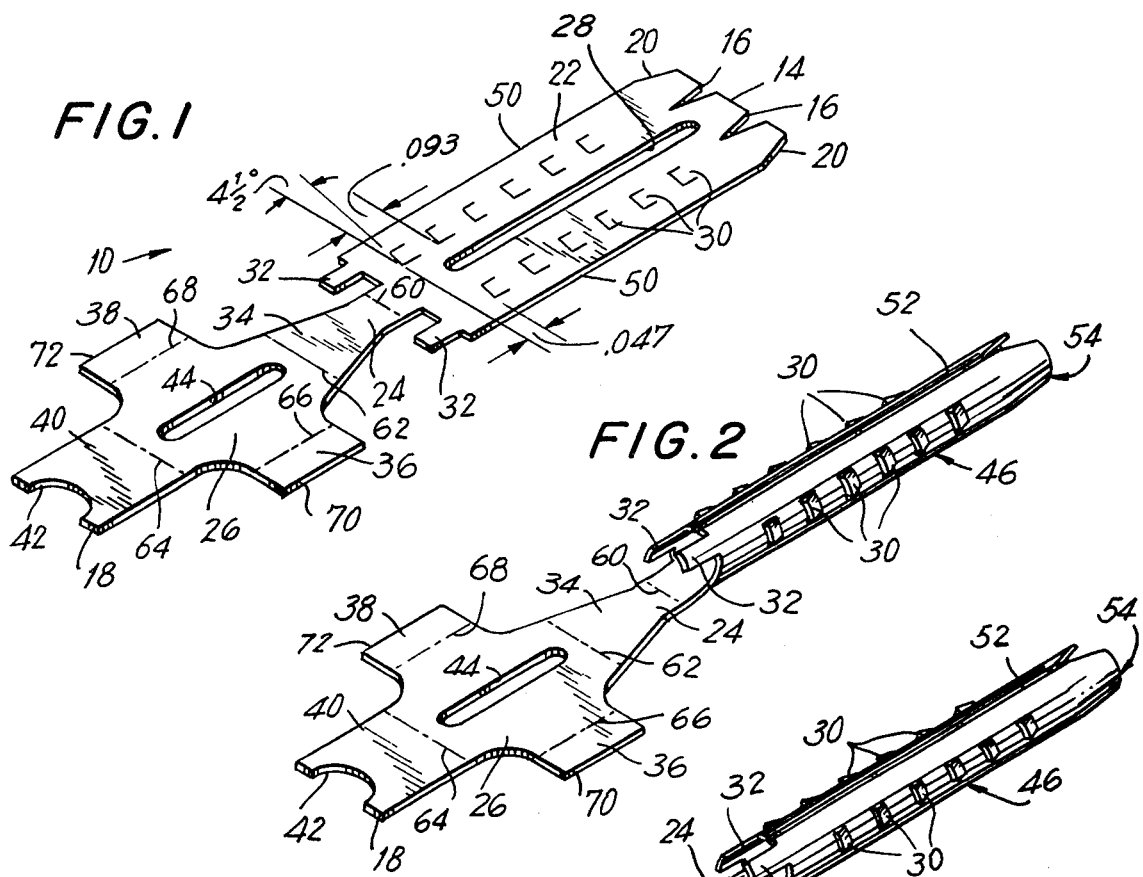
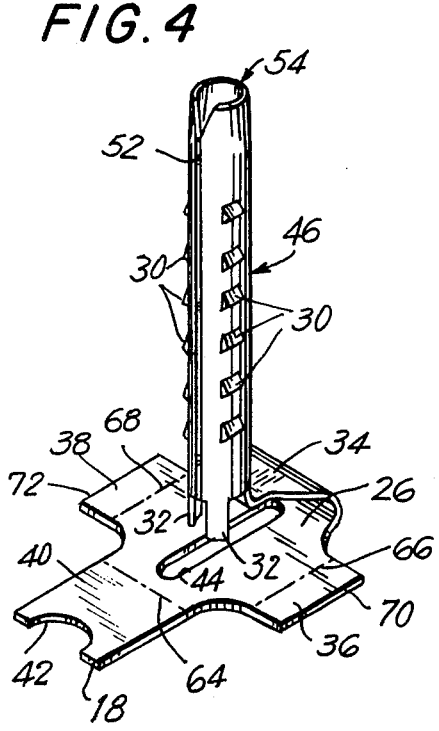
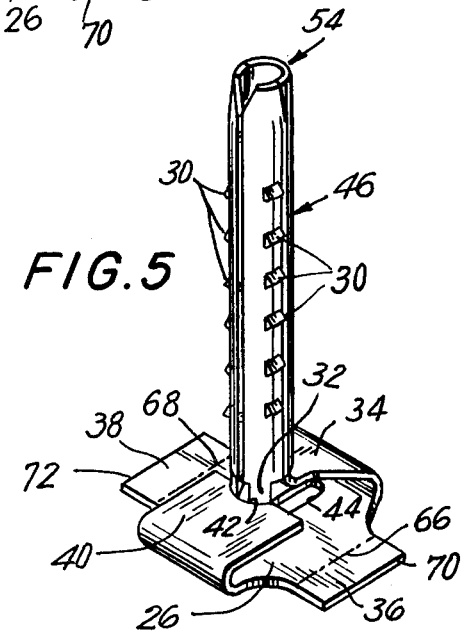

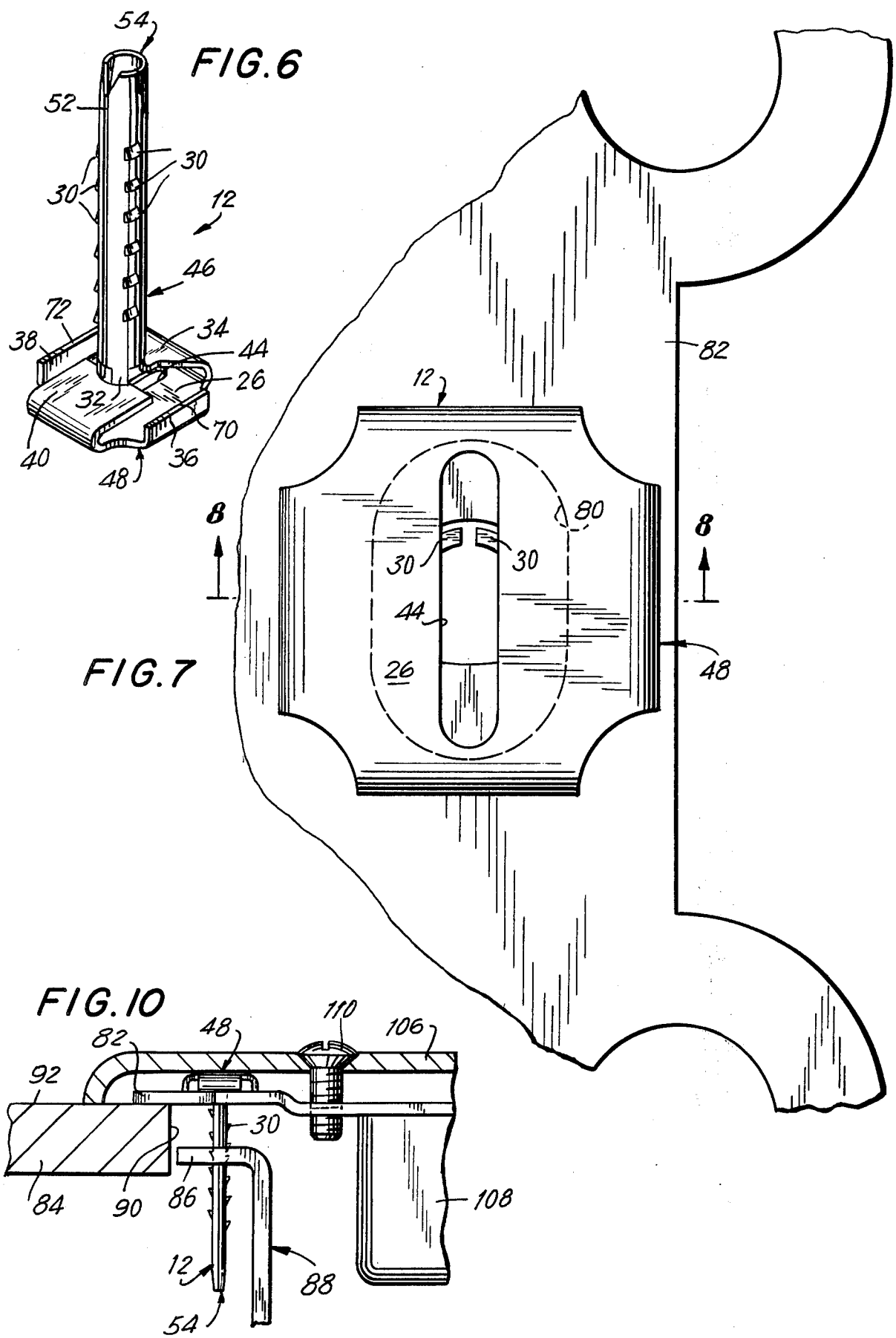

U.S. Patent    Nov. 29, 1977    Sheet 3 of 3    4,060,020
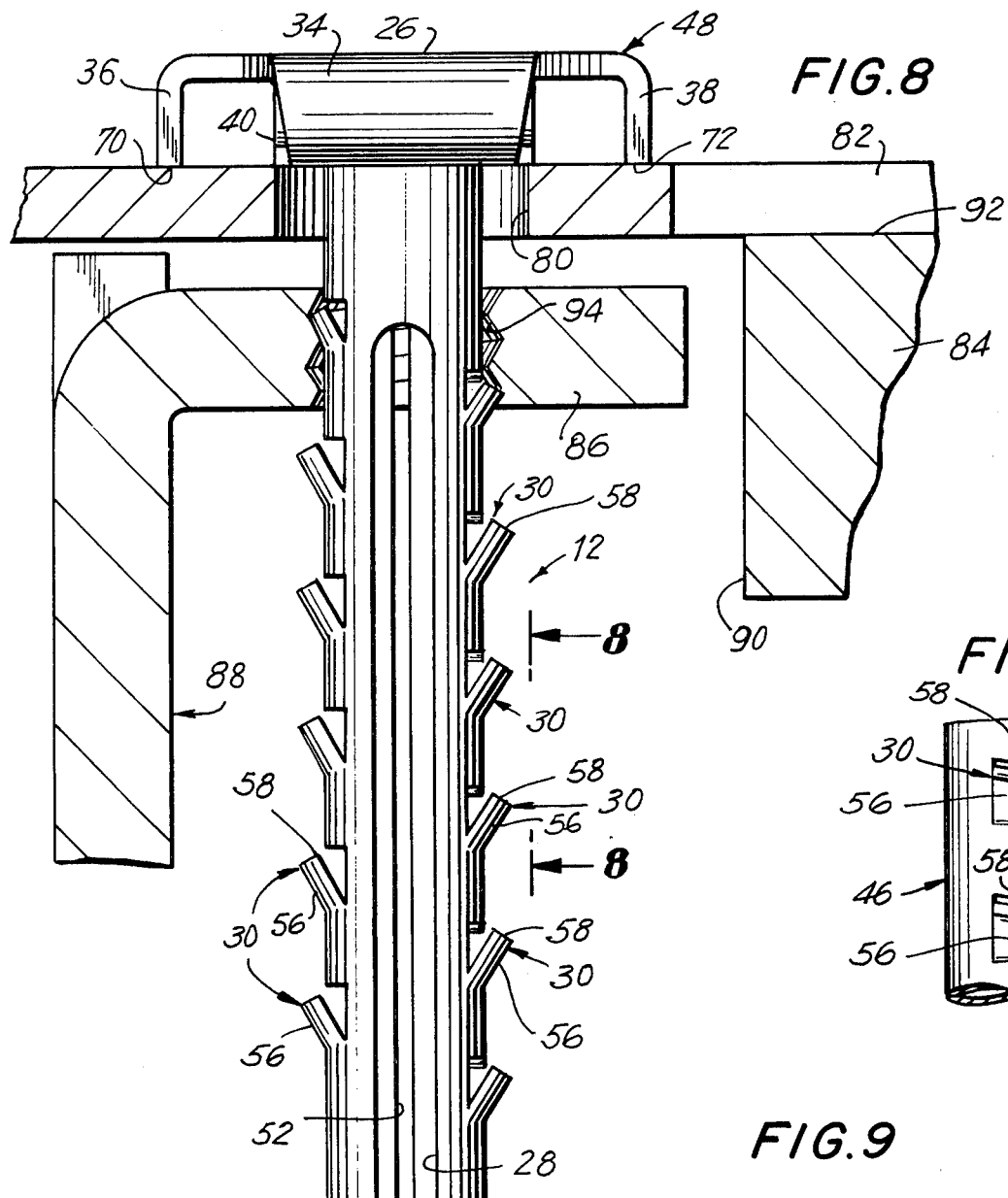
FIG.8
FIG.8A
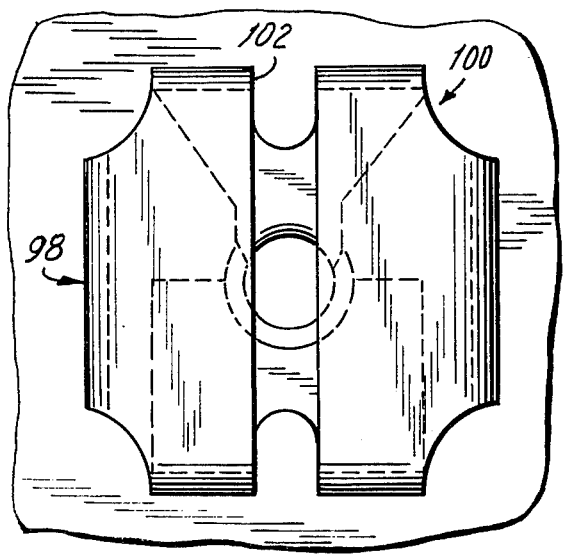
FIG.9

SHEET METAL SCREW

FIELD OF THE INVENTION

The present invention relates to a tubular sheet metal push-in mounting screw and a method of forming the same. It relates, more particularly, to a push-in mounting screw for securing an electrical wiring device in an outlet or junction box.

BACKGROUND OF THE INVENTION

With labor costs associated with the commercial installation of wiring devices in homes and office buildings constantly rising, there is a need for a reliable fastener which may be more rapidly and less expensively used by installing personnel. Since a great deal of the installation time necessary with conventional fasteners involves itself with rotatably threading the fastener into the mounting opening, a specific need exists for a mounting fastener which is capable of being pushed directly into a tapped or untapped opening, but which also may be further tightened or unscrewed when desired.

Yet another need exists for an inexpensive fastener which may be used with a wide variety of receptacle box materials, including metal as well as plastic, and which may be interchangeably utilized with conventional screws.

DESCRIPTION OF THE PRIOR ART

Generally speaking, sheet metal fastening members, including screws, are known. Examples of such members may be found in the following United States patents: Lombard U.S. Pat. Nos. 2,110,959 of Mar. 15, 1938; Poupitch 2,599,750 of July 3, 1951; Tinnerman 2,523,239 of Sept. 19, 1950; Poupitch 2,509,192 of May 23, 1950, to which reference may be made.

OBJECTS OF THE INVENTION

An object of the present invention is to provide a fastener capable of being formed from sheet metal material, for use in either tapped or untapped openings.

Another object of the present invention is to provide a fastener, as above, which may be either pushed into a support opening or rotatably screwed into or out of the opening, thereby enabling a saving of time and labor costs associated with mounting wiring devices or the like by use of this fastener.

Yet another object of the present invention is to provide a push-in mounting screw for use in installing an electrical wiring device in a junction or outlet box.

Still another object of the present invention is to provide a push-in screw for quick assembly in supporting an electrical wiring device in a junction or outlet box with a resulting saving in time and labor in the installation.

A further object is to provide a push-in screw formed from a blank of sheet metal having a tubular shank with resilient teeth arranged thereon in a helical path, and having a slotted head formed integrally therewith for tightening and removal of the screw.

Other objects and advantages of the invention will become apparent and be better understood from the accompanying drawings and the following description.

BRIEF DESCRIPTION OF THE DRAWINGS

FIG. 1 is a view in perspective of a blank of sheet metal for forming a screw embodying the present invention and is drawn to an enlarged scale;

FIG. 2 is a view in perspective of the blank shown in FIG. 1 with spaced teeth formed on a shank portion of the blank and the shank portion being rolled into tubular form with the teeth extending outwardly therefrom in a helical path;

FIG. 3 illustrates the rolled blank shown in FIG. 2 with a transverse bend in a neck portion connecting a T-shaped upper end of the blank to the shank end of the screw;

FIG. 4 is a view in perspective of the blank shown in FIG. 3 with the T-shaped upper end of the blank folded transversely of the shank in forming the head end thereof;

FIG. 5 is a view in perspective of the blank shown in FIG. 4 with the T-shaped upper end of the blank folded rearwardly in forming the headed end of the screw;

FIG. 6 is a view in perspective of the blank shown in FIG. 5 with opposite sides of the T-shaped upper end folded downwardly in forming supports for the headed end of the screw;

FIG. 7 is a fragmentary plan view of the screw shown in FIG. 6 installed in a supporting member and drawn to an enlarged scale;

FIG. 8 is a view in vertical section taken along line 8—8 of FIG. 7;

FIG. 8A is a fragmentary side view of a portion of the screw shown in FIG. 8 as seen along line 8A—8A of FIG. 8;

FIG. 9 is a plan view of a modified form of screw drawn to a reduced scale;

FIG. 10 is a fragmentary side view in partial section illustrating the arrangement shown in FIG. 8 with a face plate and a different spacing between the parts which are drawn to a reduced scale.

DETAILED DESCRIPTION OF THE DRAWINGS

Referring now in more detail to the drawings, in FIG. 1 what will be termed a "blank" 10 of sheet metal material formed from either a sheet or strip of steel or other suitable metal is shown in a perspective view. Blank 10 represents either the result of a single or a progressive number of cutting operations performed with the use of progressive dies, or the like, as is the case in finally forming a mounting screw 12 (FIG. 6) from blank 10.

Blank 10 extends from what will be termed a lower end 14 formed with a pair of notches 16, to an opposite end 18. In addition to notches 16, end 14 of blank 10 is further formed with beveled edges 20, the function of which will become more apparent below.

For ease in describing the make-up of mounting screw or fastener 12, and the forming operations associated with fabricating screw 12, blank 10 will be described in terms of consisting of integral sections, namely shank section 22, interconnecting web section 24, and central head section 26.

FIG. 1 best illustrates the presence of an elongated opening or slot 28 formed centrally through shank section 22. Slot 28 lies intermediate two rows of toothed projections or teeth 30, which extend downwardly out of the plane of blank 10. Also integral with and extending longitudinally from shank section 22 are a pair of tabs or tongue members 32, which are spaced from one another and which lie on opposite sides of web section 24.

A tapered tab section 34 joins web and head sections 24 and 26, with oppositely extending side tabs 36 and 38 extending outwardly from central head section 26. What will be referred to as an end tab 40 likewise extends integrally from central head section 26 toward its end 18. An arcuate or semicircular notch 42 is formed in the end surfaces of end tab 40. In a preferred embodiment of this invention, an elongated opening 44 is centrally formed within head section 26, and lies substantially along the same axis as elongated slot 28.

Having generally described the configuration and dominant elements of blank 10, it will now be possible to describe the steps of formation of screw 12, progressively illustrated in FIGS. 2–6 of the drawings. By use of automatic progressive die machinery, blank 10 is bent and formed in a predetermined number of steps to provide a screw 12, consisting of an elongated barrel or shank portion 46 which is integral with a head portion 48.

FIG. 2 illustrates the results of a step of rolling shank section 22 about a longitudinal axis to form elongated tubular barrel or shank portion 46. Side edges 50 of shank section 22 remain slightly spaced from one another in the final rolled tubular configuration shown in FIG. 2, thereby defining an elongated slit 52 which lies diametrically opposite the slot 28 now extending longitudinally along barrel or shank portion 46.

It can be seen in FIGS. 2–6 that the surfaces defining notches 16 at end 14 of blank 10 join one another when barrel or shank portion 46 is rolled into its tubular shape, thereby providing the user with a fastener shank portion 46 having a tapered end 54, which will more easily enter the tapped or untapped opening within which the fastener or screw 12 will be located. Beveled edges 20, on the other hand, extend at an angle from slit 52 for form a notched configuration in tapered end 54.

It will now be convenient to describe in more detail the teeth 30 previously referred to in describing the formation of blank 10. Each of teeth 30 basically consists of a cantilevered projection cut from the body of shank section 22 so as to project outwardly from the longitudinal axis of shank portion 46 when completely formed, as best seen in an enlarged view within FIG. 8. Teeth 30 include an inclined outer bearing surface 56, which extends between the body of shank section 22 and a free or outer edge 58. These edges 58 of teeth 30 are inclined relative to the longitudinal axis of barrel or shank portion 46 at an angle of approximately 4-½°, and are spaced relative to one another along the barrel at a distance of approximately 0.093 inches. With the distance between teeth 30 on opposite sides of the barrel being spaced relative to one another by an amount approximately 0.047 inches, these teeth assume a substantial arrangement of a helical path around and along the length of barrel or shank portion 46.

Referring now once again to the steps of the formation of fastener or screw 12, FIG. 3 illustrates the results of a progressive step of formation beyond that illustrated in FIG. 2, wherein a 90° bend along a line in each of web section 24 and tapered tab section 34, results in a Z-type configuration whereby the longitudinal axis of shank portion 46 extends substantially parallel with respect to the unbent surfaces of central head section 26. For the sake of clarity, the reference lines along which bends will be made in blank 10 have been given reference numbers 60, 62, 64, 66 and 68 in FIG. 2. Thus, in FIG. 3 it can be seen that a 90° bend has been made along reference line 60, with an opposite 90° bend having been made along reference line 62. In FIG. 4, it is seen that in another step, the 90° bend along reference line 62 has been further extended to approximately 180° such that the longitudinal axis of barrel or shank portion 46 extends at right angles with respect to the surfaces of central head section 26. In this position, the tab or tongue members 32 extend toward but in spaced relation with respect to the upper surfaces of central head section 26.

In FIG. 5 we see the result of a bending of end tab 40 along reference line 64 in an amount of approximately 180° such that tab section 34 and end tab 40 extend in substantially parallel relationship with respect to the central head section 26, with the surfaces of end tab 40 defining notch 42 lying adjacent and captively restraining side and outward movement of tongue members 32.

Finally, in FIG. 6 we see the result of the upward 90° bending of side tabs 36 and 38 along reference lines 66 and 68, such that edge surfaces 70 and 72 of side tabs 36 and 38 lie within a common plane with the uppermost horizontal surfaces of tab section 34 and end tab 40.

In use, fastener or mounting screw 12 may either be utilized in much the same manner as a conventional screw, or preferably, screw 12 exhibits favorable characteristics that are unknown to the art. More specifically, in the case of an electrician or tradesman who may be installing electrical wiring devices in great quantities within receptacle boxes located in a new building, for example, what is customarily done is: the wiring device is placed within the receptacle box opening such that, after being electrically wired, the slotted opening of the mounting yoke overlies the normally threaded opening formed in the receptacle box. With conventional screws, the electrician must start the screw and rotate it a great number of times until the wiring device yoke is firmly held to the receptacle box or surfaces surrounding it. While the amount of time required to thread conventional screws as just described is not great, the cumulative effect when dealing with a great quantity of wiring devices, whether they be switches or receptacles or the like, runs into an enormous expense when multiplied by today's labor rates. The result is increased costs to the installer or contractor which are, in turn, passed on to the ultimate purchaser.

With screw 12, the tradesman grasps the head portion 48 of screw 12 and, after locating the receptacle box opening with tapered end 54, he pushes shank portion 46 well into the receptacle box opening until finger pressure upon head portion 48 results in no further inward movement of screw 12 into the opening. Thereafter, with only a minor number of turns or partial turns necessary, the tradesman easily inserts his screwdriver into opening 44 and completes the installation of screw 12 with a turn or two.

It should be obvious from the foregoing paragraphs that a significant amount of time is saved by simply pushing screw 12 into its nearly installed position, without the need of time-consuming threading, with a resultant savings in time (and money) for each fastener.

The push-in insertion of screw 12 within the receptacle box opening that has just been described is facilitated by means of the structure that has been described above for FIGS. 1 – 6. Shank portion 46 is resilient in that teeth 30 are deflectable and resilient with respect to the material comprising shank section from which they project. In addition, the entire barrel comprising shank portion 46 is itself resilient and is resiliently collapsible as a result of the presence of both slot 28 and slit 52. Thus, what would otherwise be an interference between the outer configuration of shank portion 46 and the internal threads or surfaces comprising the receptacle box opening does not prevent the insertion of shank portion 46 therewithin. Upon the user exerting finger pressure against head portion 48, the inner surfaces of the opening within which shank portion 46 is urged actually ride against bearing surfaces 56 of teeth 30, thereby deflecting the teeth inwardly toward the longitudinal axis of the shank portion, together with the shank portion itself.

Once pushed into place, as described, helically extending edges 58 provide both a resistance to non-rotatable removal of screw 12 from this opening, as well as the ability to either thread screw 12 into or out from this same opening.

The use of screw 12 will be better appreciated from a description of FIGS. 7 - 10. In FIG. 8 screw 12 is shown extending through an opening 80 within the yoke 82 of a wiring device, shown as a receptacle or switch. Yoke 82 is shown in fragmentary sectional view within FIG. 8 resting against a portion of a wall 84. Also shown in FIG. 8 is the ear 86 of a receptacle box 88 located within an opening 90 within wall 84. As is often the case, the distance of ear 86 from outer surfaces 92 of wall 84 will vary, depending upon a great number of variables.

Receptacles and junction boxes will vary in shape and materials they are formed from. For purposes of illustration, a metal receptacle box 88 is depicted in FIG. 8, with internal threads 94 formed through ear 86 thereof. It should be emphasized here that screw 12 may be used with a variety of materials insofar as junction or receptacle boxes are concerned, and this invention is usable with either tapped or untapped openings of a variety of sizes.

FIG. 8 illustrates screw 12 in place, holding yoke 82 of the wiring device against surfaces 92 of wall 84 by means of the threaded and captive contact between teeth 30 of shank portion 46 and the inner threads 94 within ear 86. It can be seen in FIG. 8 that the outer diameter of shank portion 46, as measured from the outermost extremity of edges 58 of diametrically opposite teeth 30, exceeds the root diameter of internal threads 94. Accordingly, when the user presses against surfaces of central head portion 26 when inserting screw 12 through opening 80 into engagement with internal threads 94, pushing of the screw downwardly, as shown in FIG. 8, will result in the inward deflection of teeth 30 toward the longitudinal axis of shank portion 46, as well as a resilient collapsing of the shank portion 46 itself. Those portions of the shank portion 46 that pass through ear 86 substantially return to their original position, while those teeth within internal threads 94 will actually bite and frictionally engage the internal thread configuration in much the same manner as the external threads of a conventional screw, with the added advantage of the outward resilient forces at play. Thus, the final positioning of screw 12 through ear 86 is accomplished by means of a rotating of screw 12 with a screwdriver through opening 44 until the surfaces 70, 72 and those surfaces of tab section 34 and end tab 40 which lie within a common plane come to rest against the outer surfaces of yoke 82.

FIG. 7 is a plan view showing the position of screw 12 with respect to yoke 82 of the wiring device in question. FIG. 8A best illustrates the shape or configuration of teeth 30, insofar as their helically extending edges 58 are concerned.

FIG. 9 illustrates an alternate embodiment of the present invention wherein a head portion 98 of screw 100 is shown. A principal reason for illustrating the modified form representing screw 100 is to show the presence of a tool-receiving slot 102 which, unlike opening 44, extends transversely with respect to the longitudinal axis of screw 100 through the entire head portion 98. One of the advantages of the configuration of opening 44 of screw 12 is the presence of a closed-loop of surfaces defining opening 44 which will prevent the transverse escape of a screwdriver once in this opening. Those of us who have used a screwdriver frequently will recognize the age-old problem of slippage of the screwdriver blade from the slot of the fastener. This is greatly limited by means of the shape of opening 44 of screw 12. On the other hand, one of the advantages of the through-type slot 102 of screw 100 resides in the ability of the user to use screwdrivers of a variety of blade widths, although this is not necessary to enable the invention to function according to its intended uses.

FIG. 10 best illustrates another assembled use of a screw 12 wherein the ear 86 of a receptacle box 88 is shown recessed a greater distance within the opening 90 formed in wall 84 within which the receptacle box is located. It can be seen that screw 12 functions equally as well with these variations in receptacle box positions, without sacrificing the beneficial features of the invention. FIG. 10 further illustrates the presence of an ornamental face plate 106 in place over the wiring device 108, and secured to the wiring device yoke by means of screw fastener 110.

One of the features of the present invention that should be emphasized here is the relative rigidity and structural integrity of fastener or screw 12, while yet providing the resilience necessary to function properly. The rigidity of head portion 48 is maintained, even utilizing relatively great forces applied by a tool, by means of the presence of the tongue members 32 which extend downwardly from shank portion 46 into juxtaposed relationship with respect to notch 42 of end tab 40, as shown in FIG. 6. Upon the application of relatively large forces against the surfaces defining opening 44, the presence of the surfaces defining notch 42 will prevent undesirable movement of these tongue members 32 such that the over-all shape of the head portion 40 and its relationship to shank portion 46 is kept intact. With this arrangement, it is unnecessary to provide tongue members or tabs which extend through the outer surfaces of the screw head and which would otherwise come into contact with the fingers of the user. In addition, the flexibility provided by slit 52 and opening 28 is not adversely affected by the presence of these tongue members 32 in the position shown. Likewise, in addition to providing a substantially planar underside head bearing surface, the members 34, 36, 38 and 40 in the configuration shown in FIG. 6 serve to add rigidity to head portion 48 in addition to providing the four-edge bearing surfaces described above.

Finally, before concluding, it must be once again emphasized that the fastener or screw 12 provided by the present invention is capable of being used with a wide variety of receiving opening surfaces, including, without limitation, rigid internal threads, flexible internal thread configurations, grooved surfaces and, for that matter, simple non-grooved surfaces of a variety of materials including plastic and metal.

The embodiments of the present invention particularly disclosed and described hereinabove are presented merely as examples of the invention. Other embodiments, forms and modifications of the invention coming within the proper scope and spirit of the appended claims will, of course, readily suggest themselves to those skilled in the art.

What is claimed is:

1. A fastener capable of being formed from a blank of sheet material, comprising, in combination: a fastener body comprising a generally tubular shank portion extending substantially about a longitudinal axis from a shank extremity, said shank portion including a plurality of generally cantilevered projection means extending outwardly from said longitudinal axis, each of said projection means including outer bearing surfaces which join substantially helically extending free edges thereof, said shank portion further including a pair of spaced tongue members integral therewith and spaced from one another, said tongue members extending in generally parallel relationship with respect to said longitudinal axis, and head means integral with said shank portion at a disposition opposite said shank extremity for transmitting both linear driving forces substantially parallel to said longitudinal axis and rotating forces about said longitudinal axis to said shank portion, said head means including external bearing surfaces for receiving said linear driving forces and internal opposing bearing surfaces extending substantially perpendicularly with respect to said external bearing surfaces for cooperatively receiving said rotating forces from a first tool inserted within an opening defined by said internal bearing surfaces, said head means further including substantially polygonal external surfaces capable of being engaged by a second rotating tool, said head portion formed by a plurality of 180° bends of sheet material extending from a web interconnecting said shank and head portions to remote surfaces disposed adjacent said tongue members for preventing rotation of said tongue members.

* * * * *